UNITED STATES PATENT OFFICE.

RICHARD HERZ, OF FRANKFORT-ON-THE-MAIN, GERMANY.

VAT DYES AND PROCESS OF MAKING SAME.

1,243,171.  
Specification of Letters Patent.  
Patented Oct. 16, 1917.

No Drawing.  
Application filed June 18, 1915. Serial No. 34,472.

*To all whom it may concern:*

Be it known that I, RICHARD HERZ, Ph. D., a subject of the King of Prussia, and a resident of Eysseneckstrasse 17, Frankfort-on-the-Main, Germany, have invented certain new and useful Vat Dyes and Process of Making Same, of which the following is a full description.

This application relates to the manufacture and production of specific new pink vat dyestuffs, while in another application I describe the whole class to which these specific dyestuffs belong.

For the production of these dyestuffs I proceed as follows:

The products of reaction of an excess of disulfurdichlorid on o-toluidin, m-toluidin and p-xylidin are at first treated with water or dilute alkalis and are then condensed in an alkaline solution with monochloracetic acid, whereby products of condensation are formed, possessing the character of aromatic o-aminocarboxylic acids. These latter substances are then diazotized and in the diazocompounds thus produced the diazogroup is substituted by cyanogen, thus nitrile compounds are obtained. These nitriles are suitably treated with alkalis, alkaline-sulfids, alkaline-disulfids, or acids whereby they are saponified and simultaneously transformed into ringcompounds, which by a further suitable treatment, preferably by heating them with dilute acids and subsequent oxidation, produce the very valuable vat colors. These dyestuffs containing sulfur in their molecule are in a dry state reddish powders, insoluble in water and the usual organic solvents, difficultly soluble in hot nitrobenzene with a red color and a yellow fluorescence and dyeing cotton and wool in a hydrosulfite vat pink shades which are distinguished by their excellent fastness and their unusual brightness.

In order to illustrate the new process more fully, the following examples are given:

*Example 1.*—100 kilos dry well ground o-toluidin-hydrochlorid are heated in a suitable vessel fitted with a stirrer with five to ten times the quantity of disulfurdichlorid ($S_2Cl_2$) to 50–70° C. until a test can no longer be diazotized and coupled. It is then diluted with an anhydrous, inert diluting agent, such as naphtha, benzene, ligroin, etc., the separating body is removed by suction, washed with one of the hydrocarbons mentioned, freed from any excess of disulfurdichlorid that may adhere to it, and dried, preferably in a vacuum at as low a temperature as possible. 120 kilos of the product thus obtained are stirred to a paste with about four times the quantity of alcohol and while gradually stirring are introduced into 1000 liters alcohol of 50% and 250 kilos caustic soda lye 40° Bé. It is an advantage to add to this mixture about 50 kilos sodiumhydrosulfite.

This mass is first cooled so that the temperature of the reaction may not exceed 30° C., after some time the whole is gradually heated to 70° C. and the stirring is continued at this temperature until a test no longer becomes turbid, when diluted with water. A neutral or slightly alkaline solution of 55 kilos monochloracetic acid in about 250 liters water and 67.5 kilos of caustic soda lye 40° Bé. are now added, the whole being heated for 2 to 3 hours at 70 to 80° C. Condensation being completed the alcohol is distilled off, the whole is filtered and the condensation product in solution may be directly used for the production of the vat dyestuff.

If however it is desired to isolate the product of condensation the filtrate is acidified and boiled whereby a crystalline white body (presumably the inner anhydrite of the new compound) separates, which is insoluble in water, dilute alkalis and acids.

For the further process it must therefore be saponified to the easily soluble alkaline salts, for instance by heating it with concentrated alkalis. For the production of the condensation product I may also proceed as follows:

*Example 2.*—120 kilos of the product of reaction from disulfurdichlorid and o-toluidinhydrochlorid are introduced while stirring well into about 3000 liters of water. The body goes first into solution with a yellowish brown color, but after some time a new transformation product crystallizes out in leaflets of a slightly reddish color. The transformation being complete, which is indicated by the discoloration of the solution, 175 kilos of caustic soda lye 40° Bé. are slowly added while stirring well. The whole is seated to about 70° C. and then a neutral or slightly alkaline solution of 55 kilos monochloracetic acid is added, heating and stirring being continued until the formation of the condensation product is finished.

Any slight quantities of precipitated impurities are filtered off, and the resulting solution may be used for the following process.

*Example 3.—Formation of the nitrile compound and converting it into the vat dyestuff.*

The solution of the condensation product, obtained as described above, is charged with about 40 kilos sodium nitrite; the mixture is then gradually introduced while stirring well in dilute cold hydrochloric or sulfuric acid (for instance 200 kilos hydrochloric acid concentrated, 500 liters water and 500 kilos ice). The resulting diazocompound remains in solution with a yellowish color, is neutralized and gradually added under constant stirring to a solution of cuprocyanid (obtained from 125 kilos of coppersulfate and 113 kilos potassium cyanid). The reaction being complete, the neutral solution is filtered off and the nitrile separated by acidifying from the filtrate as a yellowish white crystalline precipitate.

In order to produce the nitrile in a pure state it is preferable to re-dissolve the precipitate in a dilute solution of sodium carbonate, so that the solution thus obtained reacts but weakly alkaline, filter it again and precipitate by acidifying.

The saponification of the nitrile so formed and the formation of the ringbody containing sulfur may be carried out by several methods. The following is an advantageous process:

20 kilos of the nitrile are heated with 100 kilos sodiumsulfid crystals and 20 liters water about ½–1 hour to 70 to 100° C. The sodium salt of the new ringcompound separates when heated in shining leaflets, the whole is then allowed to cool, diluted with a solution of common salt, and the separated precipitate filtered off.

In place of the sodium-sulfid, sodium-disulfid may be used with equally good results; the new ringcompound is almost insoluble in such solutions in the cold, and therefore separates almost completely on cooling. The saponification of the nitrile and the formation of the ringcompound also takes place very easily and smoothly, when the nitrile is heated with concentrated alkali. If for instance 10 parts are heated with approximately 4 to 5 times the quantity of caustic soda lye of 20% to 25% NaOH for a short while only (½ to 1 hour) on the water bath, it is all changed to a crystalline pulp of the sodium salt of the new ringcompound; when cold it is filtered off. The transformation of the latter into the leucocompound of the vat color is best done by boiling with dilute acids whereby carbonic acid and ammonia are split off. The sodium salt, obtained and described above, is dissolved in water, charged with dilute sulfuric acid and the acid solution is heated in the reflux condenser until the separation of the carbonic acid and the ammonia is complete. The whole is then allowed to cool and the precipitate is filtered off. For transformation into the red vat color, the precipitate is dissolved in dilute caustic soda lye, and a current of air is passed through this solution until all the dyestuff separates in crimson flakes. The alkaline solution of the leucobody may also be oxidized to the dyestuff by potassiumferricyanid, sodiumhypochlorid, sodiumperoxid and other suitable oxidizing agents. For instance to an alkaline solution of the leucocompound potassiumferricyanid is added until red flakes no longer separate. The dyestuff is filtered off, washed out well and preferably used straightaway in paste form. When dried it is a red powder, which dissolves in hot nitrobenzene with a bluish red color and yellow fluorescence, in warm concentrated sulfuric acid with a dark green color, in the alkaline hydrosulfite vat it dissolves with a yellow color and dyes cotton and wool pink shades which surpass by their unusual purity of shade and their excellent properties of fastness all pink vat dyestuffs on the market. In exactly the same manner from the products of reaction of disulfurdichlorid on m-toluidin and p-xylidin vat dyestuffs are obtained which dye in the alkaline hydrosulfite vat cotton and wool bluish pink shades with similar properties of fastness and purity.

In the saponification of the nitrile and its conversion into a ring compound, as above described and as set forth in the following claims, I wish to be distinctly understood as not limiting myself to the use of an alkali. The same result will be produced and substantially the same products obtained by the use of alkaline sulfids, alkaline bisulfids or acids, which are in this process the equivalent of alkalis.

Having now particularly described and ascertained the nature of my said invention and in what manner the same is to be performed, I declare that what I claim is:

1. The herein described process for the manufacture of fast pink vat-dyestuffs which consists in subjecting the products of reaction from disulfurdichlorid on o-toluidin, m-toluidin and p-xylidin at first to the action of dilute alkalis preferably in the presence of a suitable reducing agent, then condensing the same in an alkaline solution with monochloracetic acid, diazotizing the products of condensation thus obtained, subjecting the diazocompounds produced to the action of cuprocyanid, saponifying and transforming the nitriles thus produced into ring-compounds by subjecting the same to the action of alkalis, and finally converting the latter into fast pink vat-dyestuffs by subjecting same to the action of dilute acids with heating and by subsequent oxidation.

2. The herein described process for the manufacture of fast pink vat-dyestuffs which consists in subjecting the products of reaction from disulfurdichlorid on o-toluidin, m-toluidin and p-xylidin at first to the action of water, then condensing the same in an alkaline solution with monochloracetic acid, diazotizing the products of condensation thus obtained, subjecting the diazocompounds produced to the action of cuprocyanid, saponifying and transforming the nitriles thus produced into ring compounds by subjecting the same to the action of alkalis, and finally converting the latter into fast pink vat-dyestuffs by subjecting same to the action of dilute acids with heating and by subsequent oxidation.

3. The herein described new pink vat dyestuffs derived from the products of reaction of disulfurdichlorid on o-toluidin, m-toluidin and p-xylidin, being in a dry state red powders, insoluble in water, dilute alkalis and acids and the usual organic solvents, difficultly soluble in hot nitrobenzene with a bluish red color and yellow fluorescence, soluble in warm concentrated sulfuric acid with a green color, forming with alkaline hydrosulfite yellowish vats and dyeing cotton and wool yellowish to bluish pink shades which are distinguished by their excellent fastness and their unusual purity.

In witness whereof I have hereunto signed my name this sixth day of May 1915, in the presence of two subscribing witnesses.

RICHARD HERZ, Ph. D.

Witnesses:
JEAN GRUND,
CARL GRUND.